US005589851A

United States Patent [19]
Valdés et al.

[11] Patent Number: 5,589,851
[45] Date of Patent: Dec. 31, 1996

[54] MULTI-LEVEL TO BI-LEVEL RASTER SHAPE CONVERTER

[75] Inventors: Jacobo Valdés, Palo Alto; Eduardo Martínez, Los Altos, both of Calif.

[73] Assignee: Ductus Incorporated, Mountain View, Calif.

[21] Appl. No.: 210,869

[22] Filed: Mar. 18, 1994

[51] Int. Cl.$^6$ ........................................ G09G 5/36
[52] U.S. Cl. ............................ 345/136; 345/141
[58] Field of Search .................... 345/136, 137, 345/138, 143, 144, 147, 149, 25, 26, 16, 17, 141, 142; 395/150, 151

[56] References Cited

U.S. PATENT DOCUMENTS

| | | | |
|---|---|---|---|
| 4,158,200 | 6/1979 | Seitz et al. | 340/750 |
| 4,544,922 | 10/1985 | Watanabe | 340/728 |
| 4,851,825 | 7/1989 | Naiman | 340/728 |
| 5,068,803 | 11/1991 | Martinez et al. | |
| 5,200,740 | 4/1993 | Paxton et al. | 345/141 |
| 5,255,357 | 10/1993 | Byron et al. | 395/151 |
| 5,337,160 | 8/1994 | Jones | 358/447 |

OTHER PUBLICATIONS

Hersch, R., and Bétrisey, C., "Advanced Grid Constraints: Performance and Limitations" in Raster *Imaging and Digital Typography II*, R. A. Morris and J. André eds., pp. 190–204, Cambridge University Press, 1991.

Negroponte, N., "Aliasing: The Blind Spot of the Computer Industry", *Wired*, p. 152, Dec. 1993.

*Primary Examiner*—Richard Hjerpe
*Assistant Examiner*—Chanh Nguyen
*Attorney, Agent, or Firm*—Philip H. Albert; Townsend and Townsend and Crew

[57] ABSTRACT

A method and apparatus for converting multi-level raster shapes into bi-level raster shapes while preserving as much of the visual character of the shape is disclosed. The method and apparatus solve two main problems arising in the task: that of broken continuity (drop-outs) and that of large changes in the width of horizontal and vertical lines on the bi-level raster shape as a result of minute changes on the multi-level shape (stem width aliasing). Drop-outs are handled by identifying certain boundaries between pixels as drop-out warnings. Pixels adjacent to dropout warnings have their coverage values converted from multi-level to bi-level by a process that guarantees that at least one of them will be rounded up. Dropout warnings are found from the outline of the ideal shape used to generate the multi-level shape and represent an approximation to said outline. In a preferred embodiment, the set of drop-out warnings for an outline is the set of pixel boundaries containing the nearest pixel boundary to each intersection of the outline with mid-pixel lines. Stem width aliasing occurs because of rounding errors clustering along horizontal and vertical lines. The present invention minimizes stem width aliasing by a variable threshold technique in which the threshold value used to turn the multi-level coverage value of a pixel into a bi-level value depends on the pixel position. The multiple threshold values are used to scatter the rounding errors over neighboring pixels so that they do not cluster along horizontal or vertical lines and are therefore less apparent to a viewer. In a preferred embodiment, two different threshold values are used in a checkerboard pattern, i.e., the threshold value for every other pixel in the horizontal or vertical direction alternates between the two values.

14 Claims, 15 Drawing Sheets

PRIOR ART

PRIOR ART

MULTI-LEVEL TO BI-LEVEL RASTER SHAPE CONVERTER

BACKGROUND OF THE INVENTION

The present invention relates to the field of raster shape synthesis, i.e., the creation of shapes for display on a raster display device. More specifically, in one embodiment of the invention, multi-level raster shapes are converted into bi-level raster shapes for display on raster display devices, while preserving visual cues available with multi-level raster shapes.

A display device, as used herein, is any device which displays an image, such as a computer monitor, a television, a printer, or an image processor whose eventual output is an image on a display device.

A raster display device is a display device in which an image is represented when an array of picture elements (pixels), usually in a two-dimensional rectangular array with pixels uniformly spaced over a display surface, are colored with pixel colors to suggest the image. The image produced by a raster display device is said to be "pixelated" because the image, upon close inspection, comprises finite pixels, each colored a uniform solid color. Compare this with vector display devices and non-electronic displays, such as an oil painting, which do not exhibit pixelation.

A raster display device is characterized for our purposes by the dimensions of its rectangular array of pixels in its display surface, and the color values possible for each pixel. Thus, an image can be represented by a data set having an element associated with each pixel of the display device, where an element would have an associated X and Y coordinate position, identifying the pixel to which it belongs, and a pixel color value. In the present context, "image" refers to such a data set. Consequently, the following discussion of images will apply equally well to those images which are manipulated by image processors and those images which are displayed on display surfaces of raster display devices which have display surfaces.

While sometimes pixels are thought of as points, they may also be thought of as finite areas defined by the point which is the pixel's position and the spacing between pixels, so as to fully map the area of a display surface onto the pixels. For example, where the pixel array is a rectangular array, the pixels define a rectangular grid, and the rectangles formed by the grid lines could be used as the pixels' finite areas. In a physical display device, of course, the boundary of a pixel might not be so exact, with pixels sometimes occupying a vaguely defined area and possibly overlapping adjacent pixels' areas. Such is the case with laser printers, where a pixel is a point on a page which is colored by placing a finite amount of solid ink at the pixel position and pressing it into the page, merging with adjacent pixels in the process.

A raster device with a two-dimensional display surface can display a two-dimensional image of virtually any object, by coloring the pixels of the raster device's display surface so as to collectively suggest the desired object's shape and color. It is this flexibility, that any device can represent any object, which has made raster devices the preferred output devices for today's computers and many consumer products. Dot matrix printers, laser printers, facsimile machines, video game displays, high-definition televisions, and computer monitors are all examples of raster display devices.

Suppose a raster display is used to display an object such as a filled-in black circle on a white background. To display the circle, the circle and the background are mapped onto the display's array of pixels, and the pixels which correspond most closely to the circle are determined. Once pixels representative of the circle are identified, then those pixels are assigned a pixel color value corresponding to black and the other pixels are assigned a pixel color value corresponding to white.

Because the pixel array is made up of a finite number of pixels each of which can be assigned only one pixel color value, the circle can be displayed only approximately—a close inspection will reveal jagged edges. One way of smoothing the jagged edges is to allow pixels whose pixel area is only partially enclosed within the boundary of the circle to be colored a color between white and black according to how much pixel area is within the circle. This is sometimes called anti-aliasing, where aliasing is the "jagged edge" effect caused by the finite size of the pixels. See, for example, the article by N. Negroponte, entitled "Aliasing: The Blind Spot of the Computer Industry", *Wired*, January 1994, p. 152, for a description of the beneficial effects of anti-aliasing.

The process of generating an image that includes the depiction of an object can be divided into three steps: 1) placing the outline of the object over the pixel array of the image, 2) assigning a coverage value to each of the pixels of the image which describes what fraction of the pixel is covered by the outline, and 3) changing the color values of pixels covered by the object outline so they depict the object superimposed on whatever scene the image was depicting. Step 3 is usually performed by leaving pixels outside the object unaffected, assigning the color of the object to pixels that are completely inside the outline and assigning a mixture of the object color and their current color to those pixels that are only partially covered by the outline.

In our example of the black circle, we assumed that all pixels would be classified into inside and outside. This is a common assumption that makes step 3 simpler to perform since the pixels outside the circle would retain their color (white) and those inside the circle would be changed to the object color (black). If we had allowed pixels to be considered partially inside the outline, the color of those pixels would have to be changed to a shade of gray computed by mixing black and white in proportion to the fractions of the pixel covered and not covered by the outline. Because mixing colors is not a simple operation in some situations, forcing coverage values to be either completely inside or completely outside is a common shortcut.

It is a common occurrence that an object is shown in multiple positions in an image, possibly in different colors. In that case, the coverage values computed in step 2 need not be recomputed from scratch for each instance of the object. Typically, the coverage values are computed for a bounding rectangle, where a bounding rectangle is a rectangular array of pixels that includes all those pixels touched by the object's outline. The data set computed in this manner, comprising of a rectangular array of coverage values, can then be used to add the object to an image in different positions and with different colors, by appropriately mapping the coverage values of the bounding rectangle to the pixels of the image while performing step 3. The coverage values for the bounding rectangle of the object therefore represent the shape of the object and form what is described herein as a "raster shape". The bounding shape need not be a rectangle, but rectangles are the easiest bounding box to deal with.

If each pixel in a raster shape is allowed to have only one of two coverage values (each representing a choice between inside and outside) as in the example of our circle, the raster shape is said to be bi-level. When pixels are not restricted in this manner, the raster shape is said to be multi-level. The coverage values of a multi-level raster shape are usually given in the range 0–1. Because the coverage value of a pixel represents the fraction of the pixel covered by the object's outline, pixels completely outside the outline will have a coverage value of 0, those completely inside a coverage value of 1, and pixels on the boundary coverage values between 0 and 1.

Compared with bi-level raster shapes, multi-level raster shapes are harder to compute, require more memory to store, and are more difficult to use because they require the blending of colors. However, in exchange for the extra effort, they produce smoother shapes and better visual results overall. Nonetheless, because it is impossible to use multi-level raster shapes in devices that are not capable of representing different color tones or shades, bi-level raster shapes have applications even when the extra cost of using multi-level raster shapes is acceptable.

Prior art methods of computing bi-level raster shapes include estimating whether the coverage value for each pixel is closer to 0 or to 1 and assigning to it one of the two values. Although generally more efficient and less precise, these methods are logically equivalent to first computing a multi-level raster shape of the same size and then rounding the resulting coverage values to obtain bi-level values. FIGS. 1–4 illustrate two problems which occur bi-level shapes are computed in this manner, the problem of drop-outs and the problem of stem width aliasing.

FIG. 1 illustrates the difference between a multi-level raster shape and a bi-level raster shape. FIG. 1 shows a bounding box 10 enclosing a multi-level raster shape 14 and a bounding box 20 enclosing a bi-level raster shape 16 each or which is overlaid on a pixel grid 12. Each raster shape 14, 16 is a representation of the character "o", with the coverage values of each pixel represented graphically by the shade of gray that would be produced by using the coverage value to mix the black color of the letter with the white color of the background. In raster shape 16, it being bi-level, the coverage values are limited to 0 or 1, so pixels are colored either white or black. In raster shape 14, darker shades of gray represent higher coverage values.

Because of the resolution limitations of pixel grid 12, up close, the raster shapes do not look like the character. However, from a distance, the raster shapes do look like the character, with raster shape 14 tending to lose its jagged edges at a shorter distance than raster shape 16. As should be apparent, raster shape 16 can be derived from a description of the outline of the character "o" mapped onto pixel grid 12, or raster shape 16 can be generated from raster shape 14, by simply rounding each coverage value in raster shape 14 to either 0 or 1.

This rounding is illustrated in FIG. 2. FIG. 2 also shows bounding boxes 10, 20, but with the coverage values shown numerically instead of graphically. An outline 24 of the character "o" from which the coverage values were derived is also shown overlaid on pixel grid 12. Outline 24 is two solid curves, although they appear in FIG. 2 (and in other figures) to be broken by white space surrounding the pixel values; this is an artifact caused by white space being added to make the numbers easier to read.

As FIG. 2 shows, bi-level raster shape 16 (in bounding box 20) is generated from multi-level raster shape 14 (in bounding box 10) by changing coverage values of less than 0.5 to 0 and coverage values of 0.5 or more to 1. While this often leads to acceptable results, FIG. 3 shows one problem which occurs with this derivation.

FIG. 3 shows two raster shapes, one multi-level (26) and the other bi-level (28), generated from an outline of the character "o" taken from a font different than the font used for the "o" in FIG. 2. The character in FIG. 3 is contained in four bounding boxes 31, 32, 33 and 34. Bounding boxes 31 and 33 (left column) are overlaid with outline 30 and show coverage values numerically, while bounding boxes 32 and 34 (right column) show coverage values as gray levels. Bounding boxes 31 and 32 (top row) contain multi-level raster shape 26, while bounding boxes 33 and 34 (bottom row) contain bi-level raster shape 28.

A particular pixel 40, shown in each bounding box in FIG. 3 will now be examined. In multi-level raster shape 26, the coverage value for pixel 40 is 0.3, meaning that three-tenths of the pixel are covered by the outline. Consequently, in the bi-level raster shape, the coverage value of pixel 40 is 0, which leaves the gap in the character shown in bounding box 34. In raster shapes 26 and 28, although the curves of the character are apparently lost, they are regained as the distance between the raster shape and the viewer's eye increases, and this occurs earlier and more convincingly in raster shape 26 than in raster shape 28. This improvement does not necessarily occur for all important visual characteristics of the shapes, however.

For example, the original shape was connected and had a central opening. Raster shape 28 viewed from a distance, however, does not appear connected and appears instead as a pair of parentheses. The lack of connectivity of the bi-level raster shape is a result of blindly rounding the multi-level coverage values. The problem of broken connectivity in bi-level raster shapes exhibited by raster shape 28, is known as the "drop-out" problem.

FIG. 4 illustrates another problem with blindly rounding multi-level raster shapes to generate bi-level raster shapes. FIG. 4 shows four bounding boxes 50, 52, 54 and 56 in which an outline 58 of the character "N" is rasterized. Bounding boxes 50 and 54 (left column) are overlaid with outline 58 and show coverage values numerically, while bounding boxes 52 and 56 (right column) show coverage values as gray levels. Bounding boxes 50 and 52 (top row) contain a multi-level raster shape 60, while bounding boxes 54 and 56 (bottom row) contain a bi-level raster shape 62.

One edge of outline 58, edge 64, is a vertical edge which covers 40% of each pixel in a pixel row 66. Therefore, in multi-level raster shape 60, the pixels of row 66 are shaded with a 40% gray level, whereas the pixels of row 66 are white in bi-level raster shape 62, since 0.4 rounds to zero. This rounding also causes the loss of a visual cue, but one of a different sort. When viewing multi-level raster shape 60 from a distance, a viewer's eye would place edge 64 somewhere in the middle of row 66, whereas when viewing bi-level raster shape 62 from a similar distance, a viewer's eye would place edge 64 at the left side of row 66, since row 66 is all white. This erases the visual cue of symmetry between the two stems of the letter "N" thereby creating an instance of the general problem known as "stem width aliasing".

The prototypical solutions to the drop-out and stem width aliasing problems are described in R. Hersch and C. Betrisey, "Advanced Grid Constraints: Performance and Limitations" *Raster Imaging and Digital Typography II*, R. A. Morris and J. André eds., pp. 190–204 (Cambridge University Press, Cambridge 1991).

Efficient methods and apparatus for computing multi-level raster shapes from analytic descriptions of outlines is described in U.S. Pat. No. 5,438,656 (Application Ser. No. 08/070,135, filed in Jun. 1, 1993 ; [hereinafter "the multi-level raster shape generator"]; commonly owned by the assignee of the present application, incorporated herein for all purposes).

SUMMARY OF THE INVENTION

An improved method and apparatus for generating bi-level raster shapes from multi-level raster shapes and ideal shape descriptions is provided by virtue of the present invention. The invention represents a better way of eliminating two problems that arise in the computation of bi-level raster shapes: drop-outs and stem width aliasing.

One aspect of the improved converter is the use of drop-out warnings associated with pairs of adjacent pixels to affect the rounding of coverage values from a multi-level raster shape to a bi-level raster shape so that connectivity is preserved. In the rounding process, if neither of the pixels associated to a warning are already flagged, the pixel in the pair with the higher coverage value is flagged. The coverage value of a flagged pixel is always rounded to 1, while an unflagged pixel is rounded up only if its coverage value is above a threshold. Drop-out warnings are found from the outline of the ideal shape used to generate the multi-level raster shape, and in a preferred embodiment, are the pixel edges which are closest to intersections of the outline and mid-pixel lines.

In another aspect of the invention, variable thresholds are used to minimize stem width aliasing. With variable thresholds, the average coverage value in the bi-level raster shape more closely approximates the average coverage value in the multi-level raster shape, so that a viewer, when visually averaging an image, will perceive a more accurate rendition of the original shape than it is produced by blindly rounding the multi-level values. In one embodiment, the variable thresholds are a function of the pixel position and an offset from 0.5 in a checkerboard pattern, i.e., the threshold for every other pixel in either direction is 0.5 plus the offset and the threshold for the remaining pixels is 0.5 minus the offset.

A further understanding of the nature and advantages of the inventions herein may be realized by reference to the remaining portions of the specification and the attached drawings.

DESCRIPTION OF THE PREFERRED EMBODIMENTS

The apparatus and methods described below solve the two problems of multi-level to bi-level raster shape conversions described above: eliminating or reducing drop-outs, and avoiding or reducing stem width aliasing. Generally speaking, the drop-out problem is addressed by modifying the computation of the bi-level raster shape so that connectivity is preserved even at the cost of severely distorting the theoretically correct coverage values, and the stem width problem is solved by adding information, referred to herein as "hints" or "grid constraints", to the outline of the shape.

Also described below are methods of efficiently computing a multi-level raster shape of the desired size and then carrying out a special process to convert the multi-level values to bi-level values, using the method of the novel multi-level raster shape generator referenced above. Using this efficient method of computing multi-level raster shapes, the present invention performs as efficiently as the methods described by Hersch and Betrisey, and additionally produces solutions to the drop-out problem which minimize distortion of the coverage values while doing away with the requirement for "grid constraint" information. Although the conversions might be described below with the multi-level raster shapes generated by the novel multi-level raster shape generator, the methods described here are independent of the method used to generate the multi-level raster shape, and thus will operate as well on multi-level raster shapes generated by other means.

Figure 5:
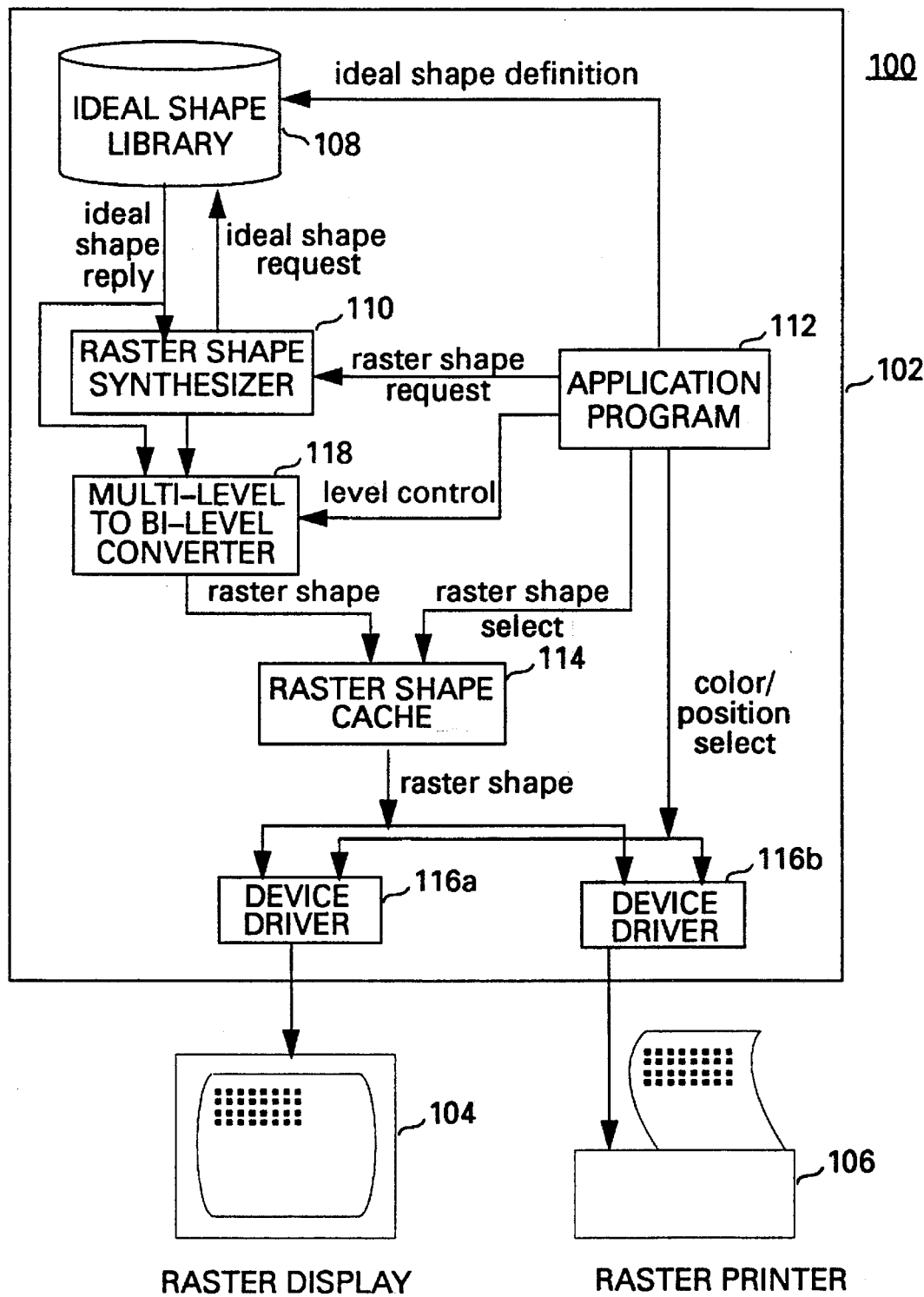
FIG. 5 is a block diagram of a computer system which uses a raster shape synthesizer to synthesize multi-level raster shapes from ideal shapes for display on raster display devices, including a means for generating bi-level raster shapes from the multi-level raster shapes.

FIG. 5 is a block diagram of an image display system 100. Image display system 100 comprises a digital computer 102, with a raster display 104, and a raster printer 106 coupled to accept output from computer 102. Computer 102 comprises a library of ideal shapes 108 which holds the analytic descriptions of the ideal shapes, raster shape synthesizer 110, an application program 112, a cache of raster shapes already synthesized 114, output device drivers 116a, 116b, and a multi-level to bi-level raster shape converter 118.

Computer 102 also includes several interconnections for data and control transfer between its various elements, the connections being implemented by hardware and/or software interconnections. The purpose of these connections are briefly described immediately below, with detailed operations described later.

Application program 112 is coupled to raster shape synthesizer 110, converter 118, raster shape cache 114, and device drivers 116a, 116b, and in some embodiments, as shown in FIG. 5, to ideal shape library 108. Application program 112, if coupled to ideal shape library 108, generates ideal shape definitions to be stored in library 108. Application program 112 also outputs raster shape selections to raster shape synthesizer 110, a level selection (selecting either bi-level or multi-level) to raster converter 118, and color/position selections to device drivers 116a, 116b.

Raster shape cache 114 is coupled to receive raster shape selection information from application program 114 and raster shapes from converter 118, and is coupled to output raster shapes to device drivers 116a, 116b. Each device driver 116a, 116b is coupled to receive raster shapes from raster shape cache 114 and color and position instructions from application program 112, which is used to output pixelated display data to an output device. The output device for device driver 116a is raster display 104, while the output device for device driver 116b is printer 106.

Other interconnections include signal lines between synthesizer 110 and library 108 over which synthesizer 110 requests ideal shape outline descriptions from the library 108 and signal lines for library 108 to provide the descriptions. Synthesizer 110 outputs multi-level raster shapes to converter 118. In some embodiments, converter 118 uses the ideal shape descriptions in its operation, which are supplied either by library 108, or are passed through by synthesizer 110. FIG. 5 shows the shape descriptions being provided by library 108.

In one embodiment, application program 112 may be a windowing system, word processor, desk-top publishing program, spreadsheet program or graphic display tool. The actual operation of application program 112 is unimportant, except so far as it selects ideal shapes to be represented as raster shapes, causes raster shapes to be synthesized from ideal shapes, selects whether bi-level or multi-level raster shapes are to be output, or causes raster shapes to be output to a device driver. When application program 112 desires a shape to be displayed in a given color at a given position on the raster image of either display 104 or printer 106, it indicates the desired shape to raster shape cache 114, and the resulting raster shape is output to the output drivers. The color and position of the shape are not needed to find the correct raster shape in the cache, and these parameters are passed directly to the output drivers. If raster shape cache 114 does not already contain the desired shape, application 112 causes raster shape synthesizer 110 to create the raster shape and place it into raster shape cache 114. Alternatively, raster shape cache 114 might include the necessary control means to request the synthesis of raster shapes as needed. In some embodiments, application program 112 is capable of generating new shape definitions to be stored in ideal shape library 108, while in other embodiments, a separate application program is required to modify ideal shape library 108.

In alternate embodiments, raster shape cache 114 might be eliminated altogether in favor of using raster shape synthesizer 110 to create raster shapes as they are needed. For the most part, converter 118 simple converts the shapes output by synthesizer 110 without caching. In some embodiments, the raster shapes are returned to the application program for further processing. After the further processing, the raster shapes can be output from application program 112 directly to device drivers 116a, 116b.

Figure 6:
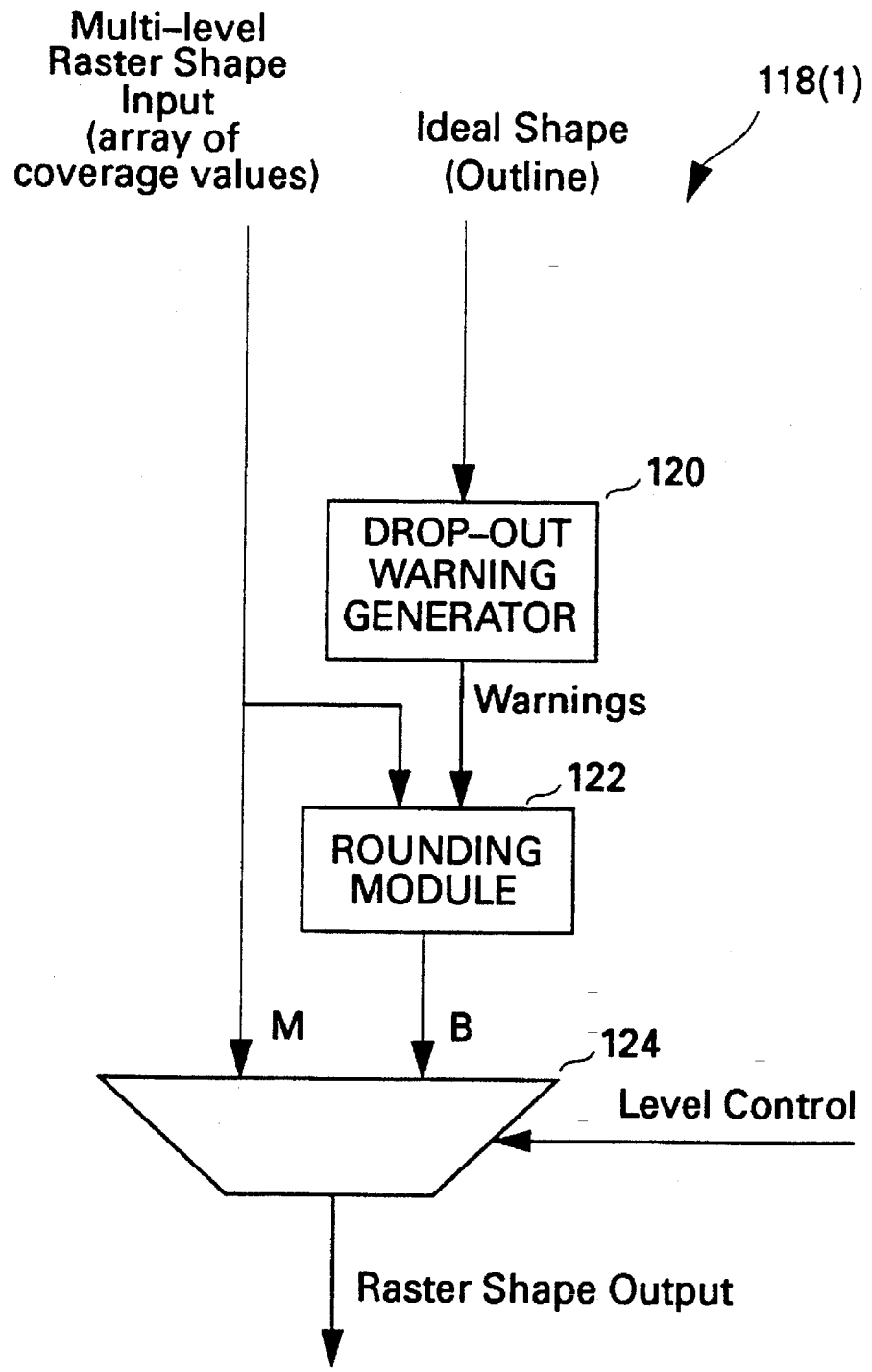
FIG. 6 is a block diagram of a multi-level raster shape to bi-level raster shape converter which corrects for drop-outs.

FIG. 6 shows one embodiment a raster converter, 118(1), in greater detail. Converter 118(1) comprises a drop-out warning generator 120, a rounding module 122 and a multiplexer 124. The interconnections of converter 118(1) include a raster shape input for receiving a multi-level raster shape in the form of an array of coverage values, each coverage value associated with a pixel in a bounding box bounding the raster shape, wherein a coverage value indicates the fraction of its associated pixel covered by the raster shape and a trajectory input to the drop-out warning generator for receiving the trajectory from which the dropout warnings are computed. An input to converter 118(1) for the outline is also provided. This input forms an input to drop-out warning generator 120.

The raster shape input is coupled to a shape input of rounding module 122, and an M input of multiplexer 124. An output of warning generator 120 is coupled to an input of rounding module 122 to pass an array of drop-out warnings thereto. The output of rounding module 122 is coupled to a B input of multiplexer 124, and the output of multiplexer 124 forms the output of converter 118(1). Multiplexer 124 also has a select input which is coupled to the select input of converter 118(1), which is in turn controlled by application program 112.

The operation of converter 118(1) will now be described. The input to the converter is a multi-level raster shape. If the select input signals that a multi-level raster shape is to be used, multiplexer outputs the multi-level raster shape from the M input of multiplexer 124 to the output of converter 118(1) unchanged. If the select input signals that a bi-level raster shape is to be used, the output of rounding module 122 is output from multiplexer 124 through its B input.

The operation of warning generator 120 will be described in connection with FIGS. 7–8.

Figure 7:
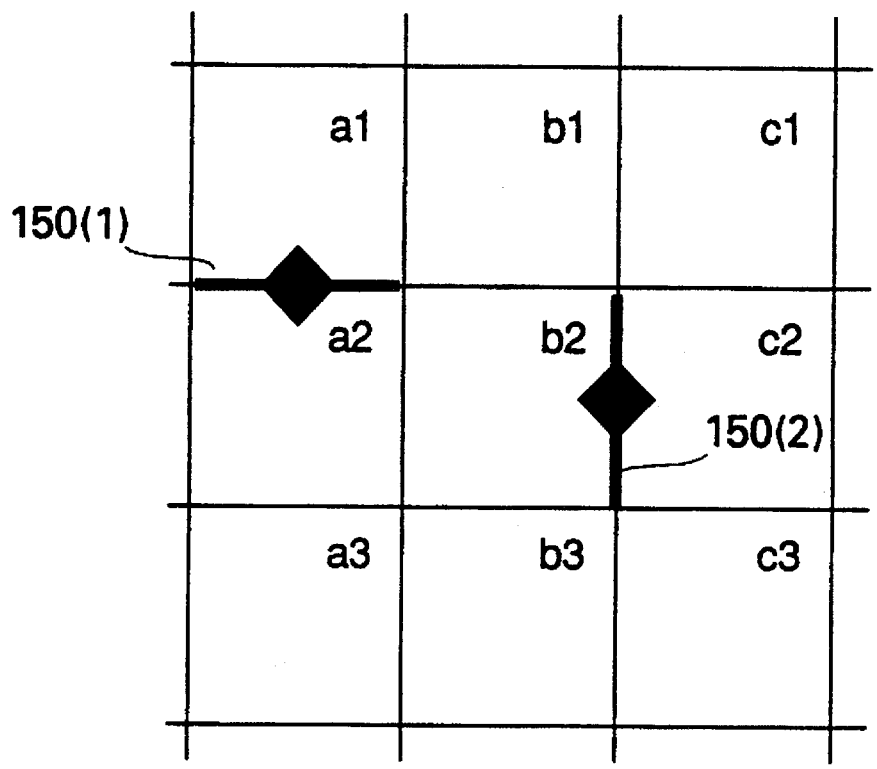
FIG. 7 is a graphical representation of drop-out warnings.

FIG. 7 is an illustration of a portion of a bounding box with pixels a1, b1, c1, a2, b2, c2, a3, b3 and c3 shown. FIG. 7 also shows two drop-out warnings 150(1)–(2) each depicted as a thick bar with a diamond in its middle. A drop-out warning is placed between to pixels to indicate that both pixels should not be rounded down to a coverage value of 0 when converting from multi-level coverage values to bi-level coverage values, because to do so might introduce a drop-out. A drop-out can be fully specified by indicating one of the pixels to which it is attached and to which edge of the pixel it is attached. Alternatively, a drop-out could be specified by specifying the two pixels adjacent to the drop-out, or by specifying whether the drop-out warning is vertical or horizontal and specifying the pixel to the left of the warning (for vertical warnings) or above the warning (for horizontal warnings). The array of drop-out warnings passed from warning generator 120 to rounding module 122 (see FIG. 6) can either be a fixed array of a size proportional to the bounding box or a variable length list of a size proportional to the number of warnings.

Figure 1:
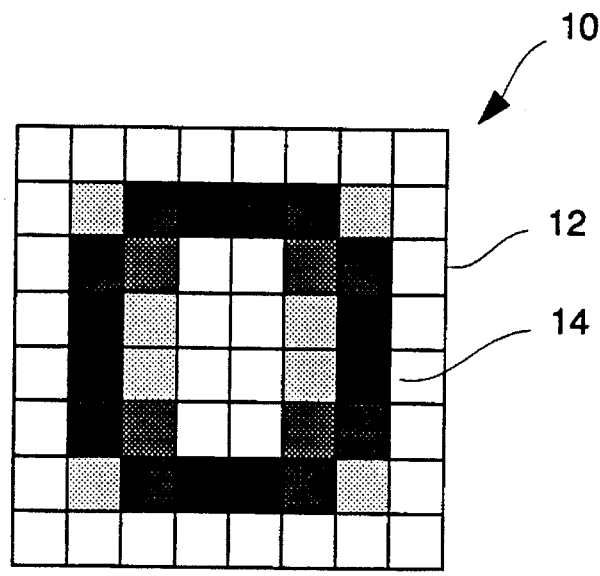
FIG. 1 is an illustration comparing a multi-level raster shape with a bi-level raster shape.
Figure 1:
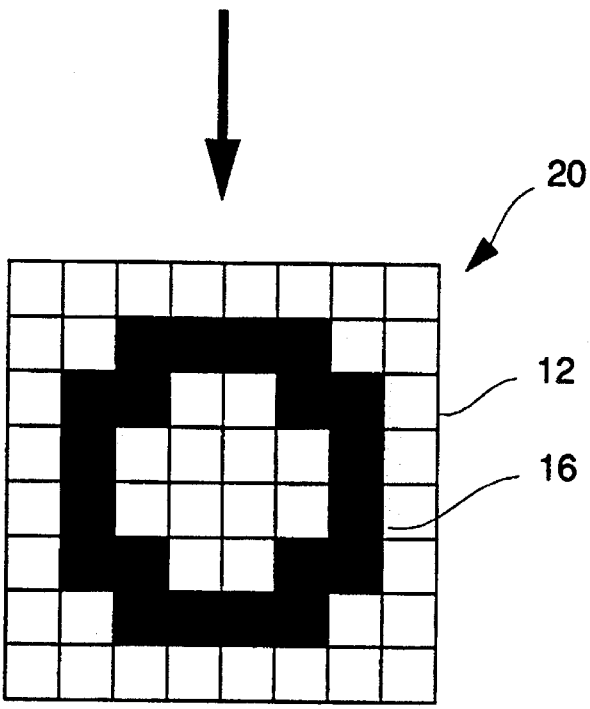
Figure 2:
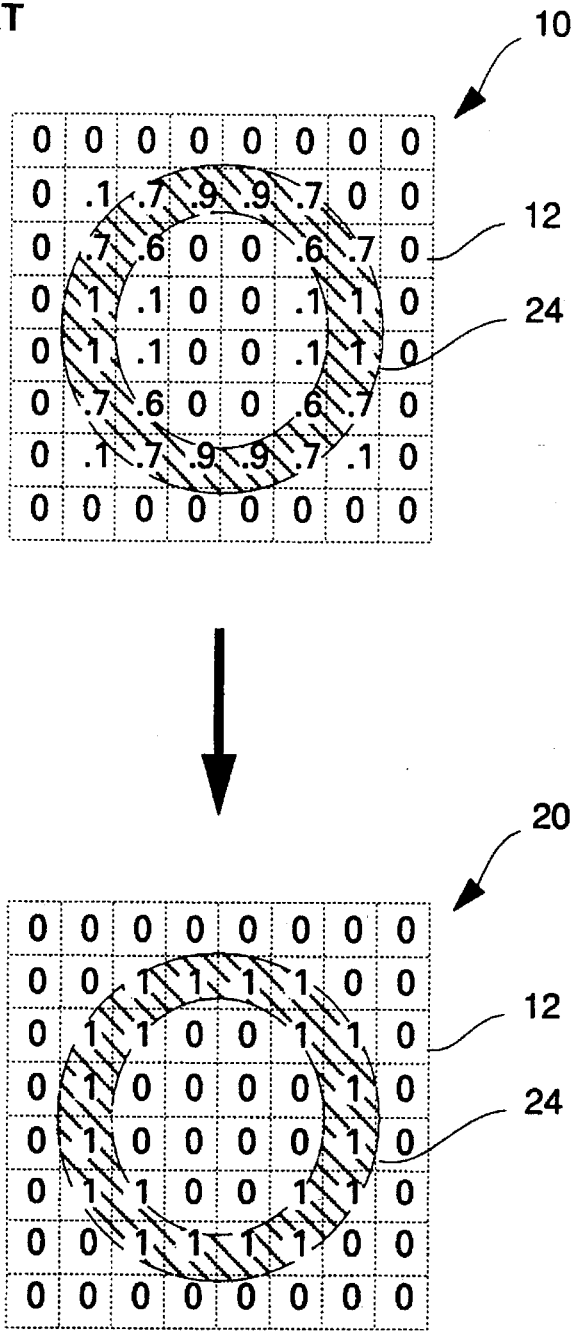
FIG. 2 is an illustration of raster shapes shown numerically and graphically.
Figure 3:
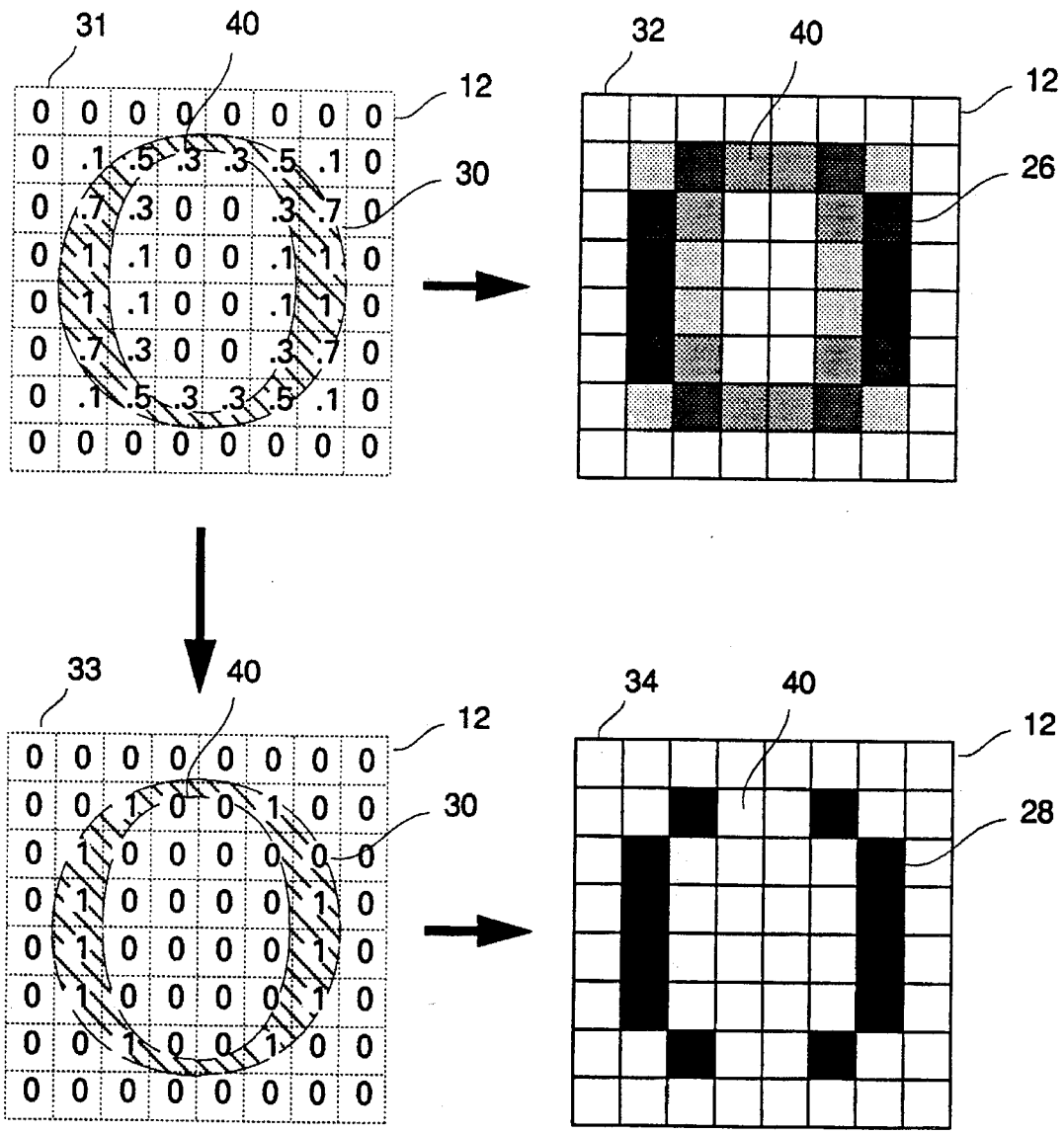
FIG. 3 is an illustration of raster shapes where a bi-level raster shape suffers from drop-outs.
Figure 4:
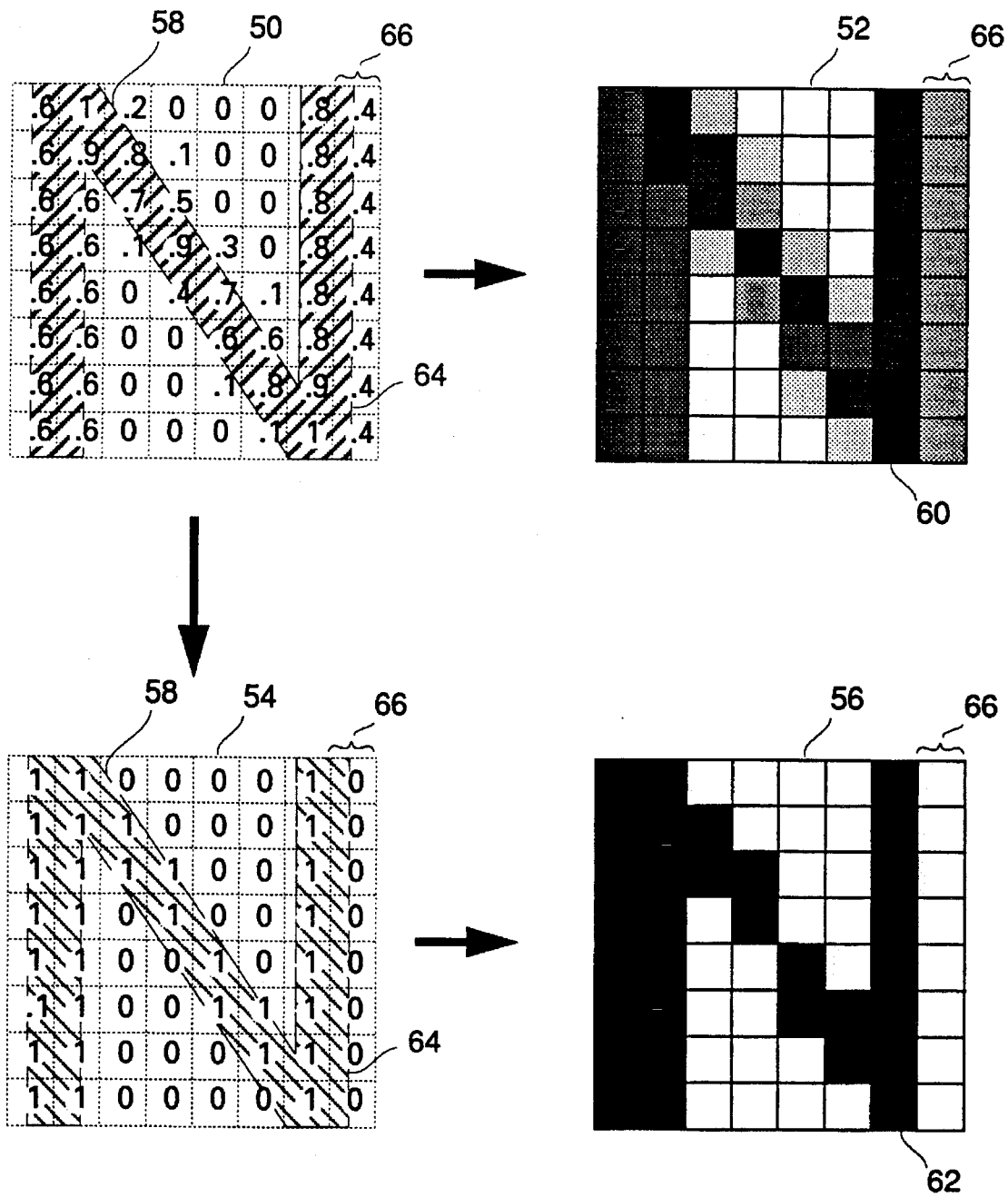
FIG. 4 is an illustration of raster shapes where a bi-level raster shape suffers from stem width aliasing.
Figure 8:
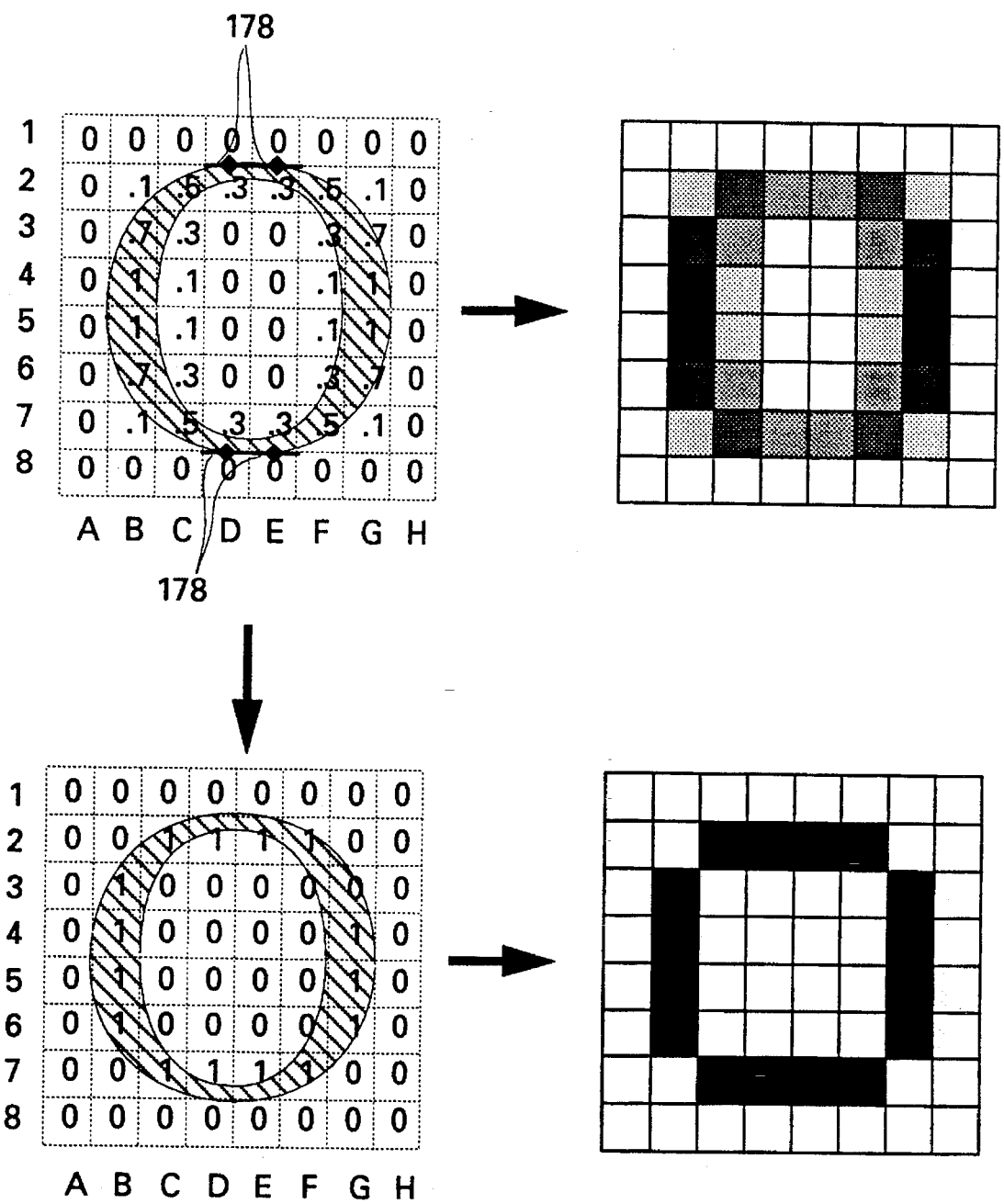
FIG. 8 is an illustration of the use of drop-out warnings in a multi-level to bi-level raster shape converter to avoid drop-outs.

FIG. 8 shows how the drop-out warnings relate to the rounding process performed by rounding module 122. FIG. 8 shows four bounding boxes, each containing a representation of the character "o", as in FIG. 3, but with the addition of drop-out warnings. For reference, the rows of pixels in the bounding boxes are labelled with the numbers 1–8 and columns are labelled with the letters A–H. The upper-left bounding box shows the outline of the character, multi-level coverage values for the outline, and four drop-out warnings between the pixel pairs D1–D2, E1–E2, D7–D8 and E7–E8. The upper-right bounding box shows the gray levels of the multi-level raster shape which would result from the coverage values in the upper-left bounding box.

The lower-left bounding box shows the outline overlaid on an array of bi-level coverage values. The multi-level coverage values of pixels D1, E1, D8 and E8 are all 0 and the multi-level coverage values of pixels D2, E2, D7 and E7 are all 0.3, so without drop-out warnings, they would all be rounded to 0. Instead, because a drop-out warning indicates that at least one pixel adjacent to the warning should be rounded up to 1. In deciding which pixel to round up, rounding module 122 looks to the coverage values of the two pixels adjacent to a drop-out warning, and if both are less than 0.5, rounds up the largest of the two. Thus, the pixels D2, E2, D7 and E7 are rounded up to 1 in the lower-left bounding box. The lower-right bounding box shows the resulting bi-level raster shape.

Figure 9:
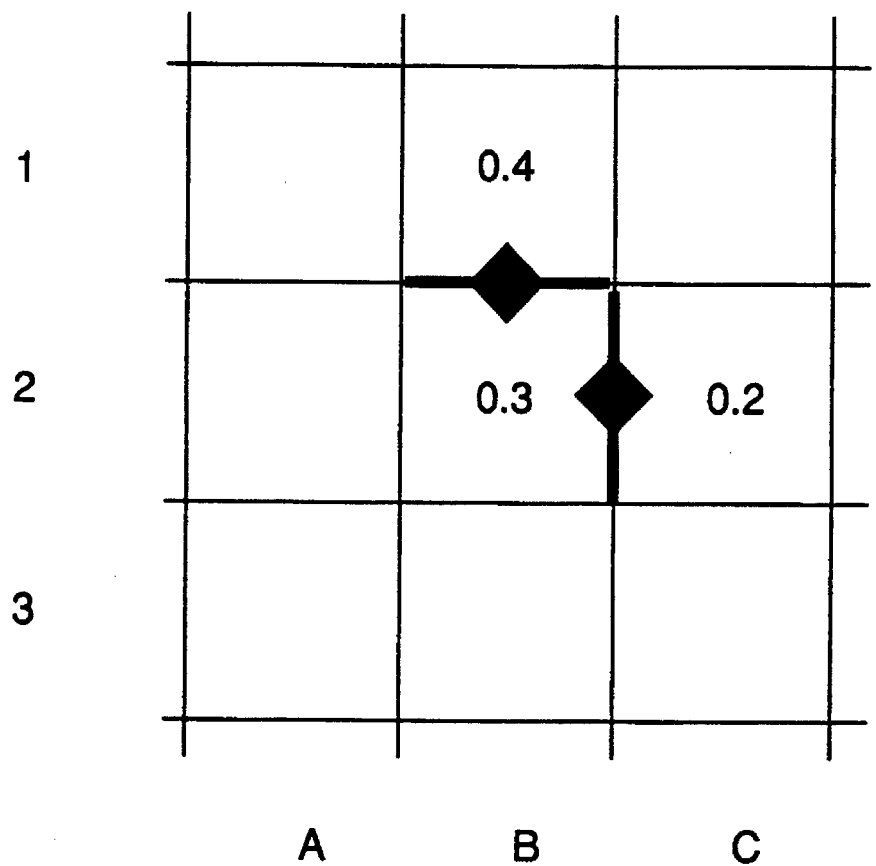
FIG. 9 is a graphical representation of drop-out warnings illustrating the order dependency of processing drop-out warnings.

FIG. 9 illustrates how the order of evaluation could affect the bi-level raster shape which results. In FIG. 9, a portion of a bounding box with nine pixels in rows 1–3 and columns A–C are shown with coverage values of B1=0.4, B2=0.3 and C2=0.2, with two drop-out warnings, B1–B2 and B2–C2. If the rounding module processes B1–B2 first, B1 is rounded up and B2 is rounded down. B2 can be rounded down because B1 satisfies the requirement of at least one pixel with a coverage value of 1.0 adjacent to the drop-out warning. Instead of actually changing coverage values at this time, pixel B1 is just marked as being a pixel which will be rounded up. The rounding occurs after all pixels have been marked, thus leaving the original coverage available for examination. The drop-out warning between pixels B2–C2 is then processed, and pixel B2, having a higher coverage value than C2, is mark for rounding up.

This evaluation order results in pixels B1 and B2 being rounded to 1 and C2 being rounded to 0. If the drop-out warnings are evaluated in the other order, B2–C2 then B1–B2, B2 is marked for rounding up, being larger than C2, but B1 is not marked for rounding up, since the evaluation of drop-out warning B1–B2 takes into account that at least one pixel in B1, B2 will be rounded up. Experience has shown that the evaluation order does not have much practical importance and any order provides acceptable results.

Figure 10:
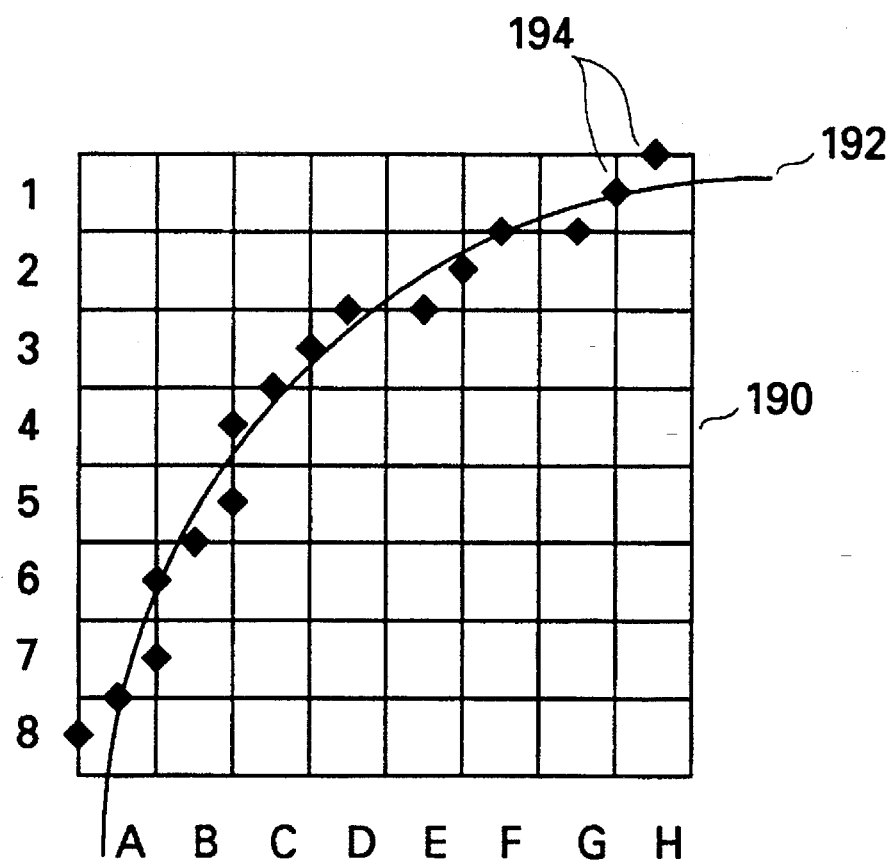
FIG. 10 is a graphical representation of drop-out warnings generated from a trajectory placed on the raster grid.
Figure 11:
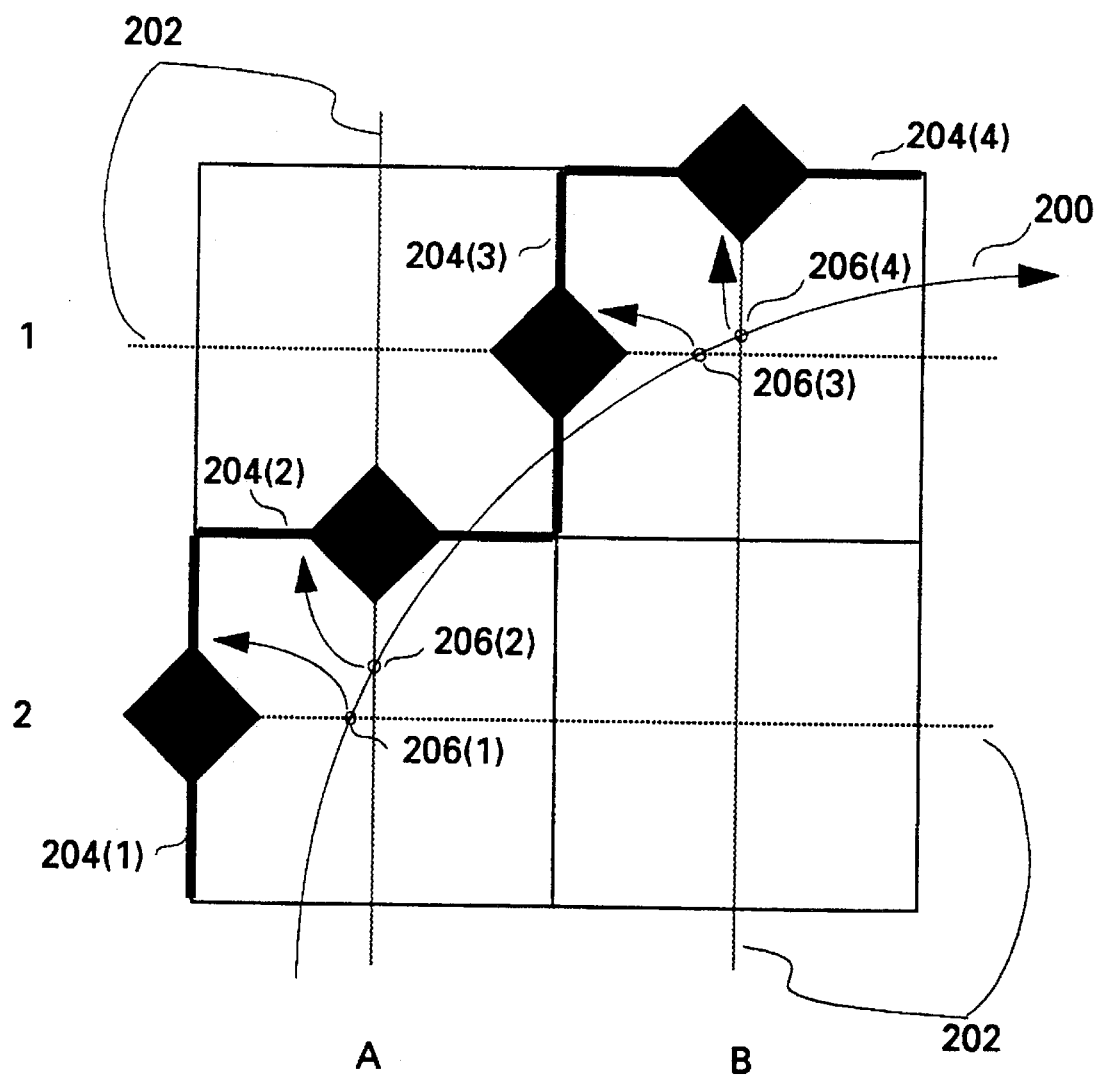
FIG. 11 illustrates one method for computing drop-out warnings from a trajectory placed on the raster grid.

FIGS. 10–11 show how drop-out warning generator 120 places the warnings. In FIG. 10, a portion of a pixel grid 190 is shown with trajectory 192 and a chain of drop-out warnings 194 overlaid. With drop-out warnings 194 so laid out, rounding module 122 assures that a continuous path of pixels with a coverage value of 1 is provided from the first pixel touched by trajectory 192 (pixel A8) to the last (pixel H1). In a preferred embodiment, the trajectory is calculated from the outline of the shape.

FIG. 11 shows more precisely how the drop-out warnings are selected. FIG. 11 shows a trajectory 200 overlying four pixels, A1, A2, B1 and B2, with mid-pixel lines 202 dividing the pixels into fourths. Also shown are four drop-out warnings 204(1)–(4) and intersections 206(1)–(4) between the trajectory and the mid-pixel lines. A drop-out warning is produced at the closest location to each intersection between trajectory 200 and a mid-pixel line 202.

Figure 12:
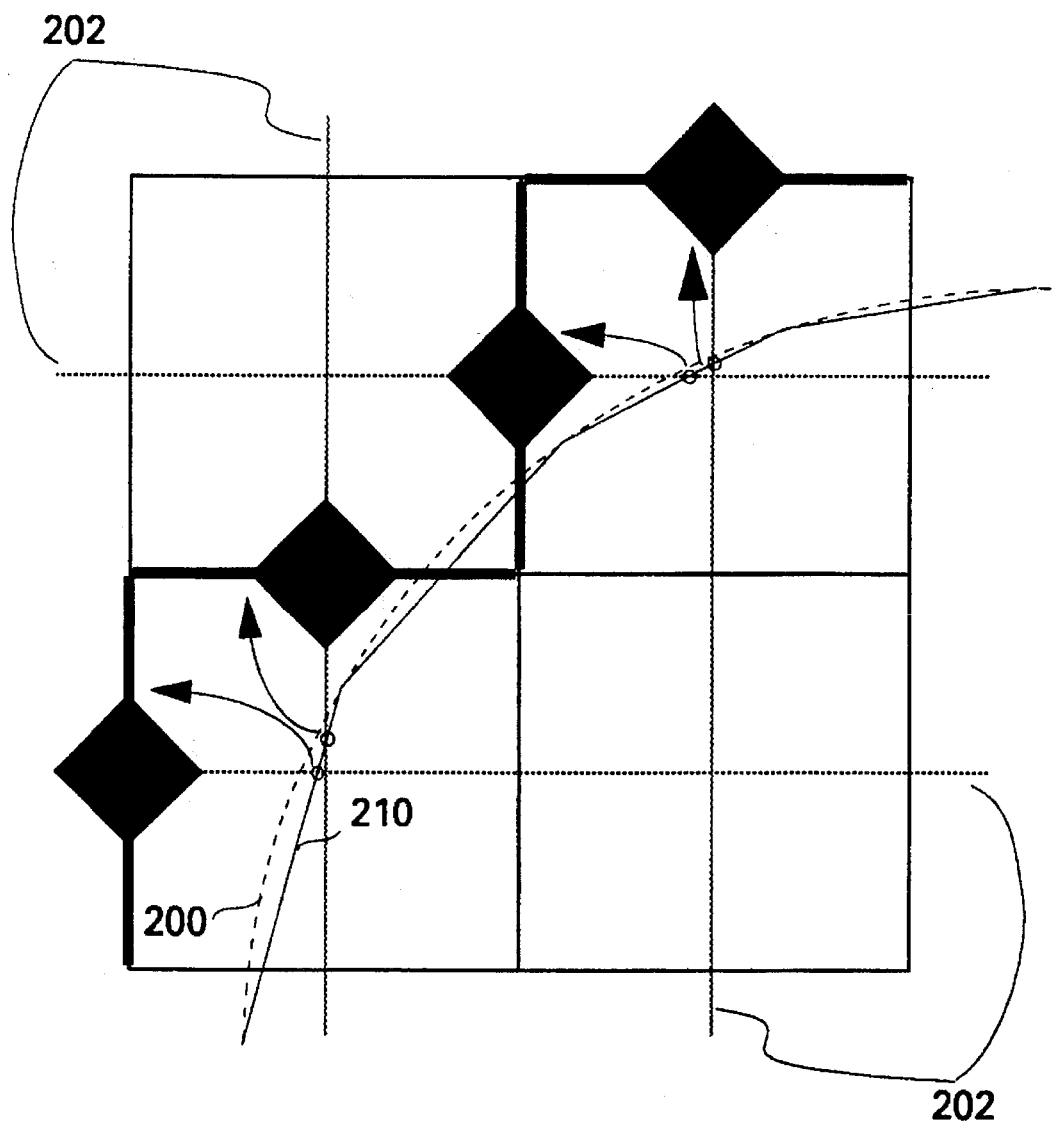
FIG. 12 illustrates a method for computing drop-out warnings from a trajectory using an approximation to the trajectory.

FIG. 12 is a variation on FIG. 11, wherein an approximation 210 of trajectory 200, made up of straight line segments, is used instead. The intersections of approximation 210 and mid-pixel lines 202 produce the same drop-out warnings, but this does not always have to be the case. This completes the description of drop-out avoidance and we now turn to the techniques used to deal with stem width aliasing.

FIG. 13 shows an ideal filled-in outline of a line 220 and raster shapes approximating the outline of line 220. FIG. 13(a) shows the filled-in outline before pixelation is taken into account; this is the ideal outline of the shape. Line 220 is 1.5 pixels wide, fully covering one column of pixels (left column L) and partially covering another column of pixels (right column R).

Figure 13A:
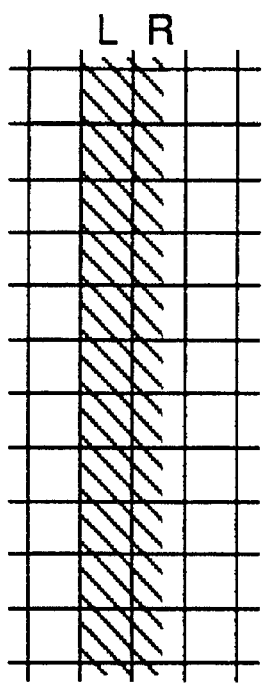
FIG. 13 illustrates the use of variable thresholds for generate non-integral pixel line widths.
Figure 13B:
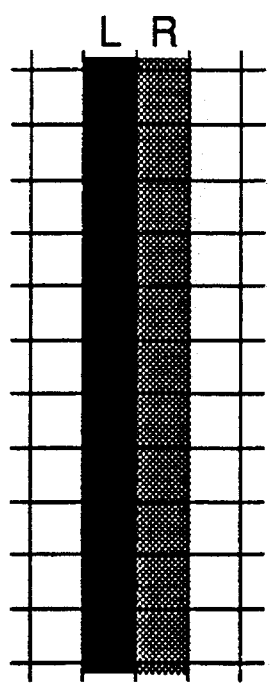

In FIG. 13(b), line 220 is represented by a multi-level raster shape. The coverage values of the raster shape are represented in FIG. 13(b) by gray levels. Because line 220 is 1.5 pixels wide and fully covers the left column, the coverage value for a pixel in the left column is 1.0 and the coverage value for a pixel in the right column is 0.5. If the multi-level raster shape shown in FIG. 13(b) is converted to a bi-level shape using a fixed threshold of 0.5, the pixels in both the left and right columns will be rounded up to 1, and the thickness of line 220 becomes 2 pixels in the resulting bi-level raster shape. If the thickness of the original line had been just slightly less and its left edge had been in the same position, the resulting line would have been just 1 pixel thick in the resulting bi-level raster shape. This process by which small variations in the original multi-level shape lead to large changes in the resulting bi-level shape is the origin of stem width aliasing. To avoid this effect, a variable threshold is used.

Figure 13C:
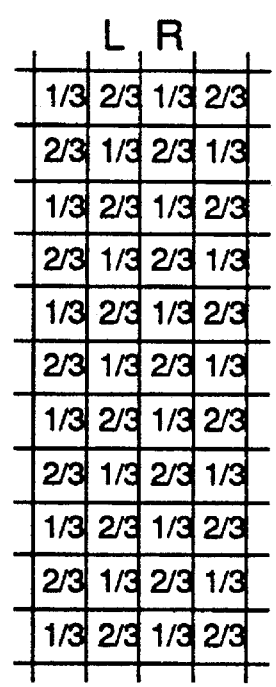

FIG. 13(c) shows the threshold for each pixel. In this example, the threshold varies between ⅓ and ⅔ from pixel to pixel with each threshold value assigned to pixels in a checkerboard pattern. Because of the checkerboard pattern, this technique works equally well for vertical and horizontal lines. Although the checkerboard pattern of ⅓ and ⅔ thresholds is shown, other threshold function could work equally well. For efficient implementation, the threshold should be a simple function of a pixel's position. In FIG. 13(c), for example, the threshold function might be $(((x+y) \mod 2)+1)/3$, where x and y are the pixel's coordinates. Thresholds of ⅓ and ⅔ are not required, but the average of the thresholds should preferably be near 0.5. An alternate threshold function is one where more than two threshold values are distributed over the bounding box.

Figure 13D:
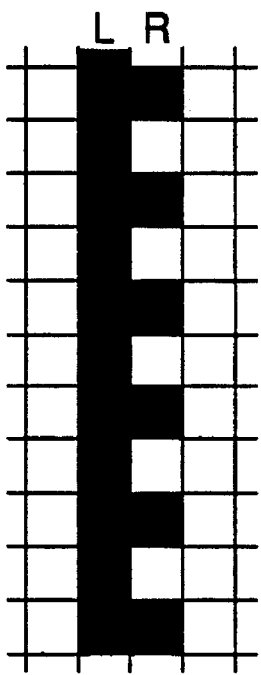

FIG. 13(d) shows the bi-level raster shape which results from the variable threshold rounding. Every pixel in the left column has a coverage value of 1, so they always round to 1, but the rounding of the pixels in the right column vary. Each pixel has a coverage value of 0.5, so if the threshold is ⅓, the coverage value is rounded up, and if the threshold is ⅔, the coverage value is rounded down.

Figure 13E:
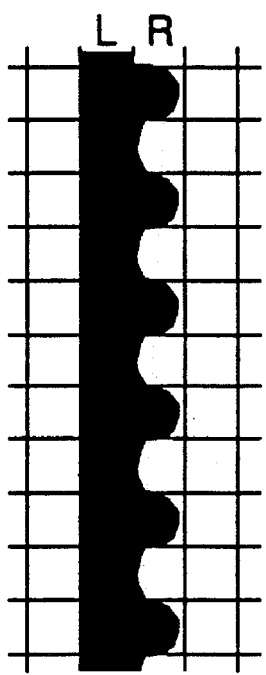
Figure 13F:
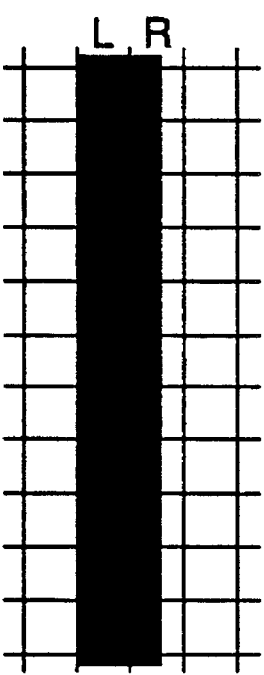

FIG. 13(e) shows what an output device might print based on the bi-level raster shape of FIG. 13(d), with pixels appearing on the output of the device being somewhat rounded. FIG. 13(f) shows how the output of the raster device displaying the bi-level raster shape of FIG. 13(d) might appear to a viewer a sufficient distance from the output. As FIG. 13(f) shows, what the viewer sees is apparently the ideal shape. This beneficial effect is provided by the apparatus shown in FIG. 14.

Figure 14:
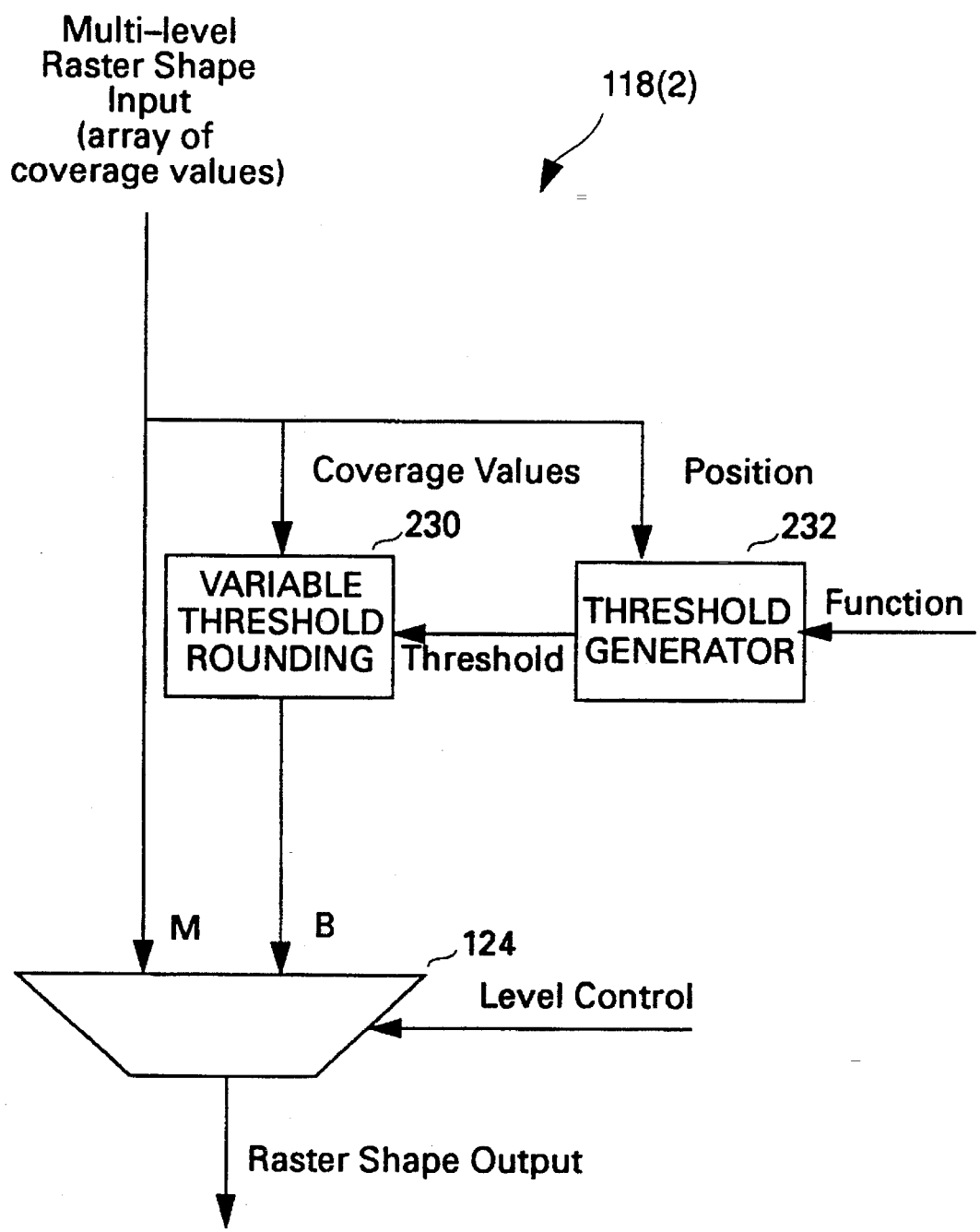
FIG. 14 is a block diagram of a multi-level raster shape to bi-level raster shape converter which corrects for stem width aliasing.

FIG. 14 is a block diagram of a multi-level raster shape to bi-level raster shape converter 118(2) which corrects for stem width aliasing through the use of a variable threshold function. A shape converter 118 includes a multiplexer 124 which has an input for selecting which of two raster shape inputs to coupled to its output. One of the raster shape inputs is provided with the multi-level raster shape input to converter 118, and the other is provided with a bi-level raster shape derived from the multi-level raster shape. Thus, converter 118(2) is similar to converter 118(1) except in those portions of the apparatus which derive the bi-level raster shape.

Converter 118(2) includes a variable threshold rounding module 230 and a threshold generator 232. Module 230 has an input for receiving a multi-level raster shape in the form of an array of coverage values with each coverage value associated with a pixel in a bounding box. Module 230 also has an input for receiving a threshold value for each pixel from threshold generator 232. Threshold generator 232 includes an input for receiving pixel position information from the multi-level raster shape input to converter 118(2). In some cases, the position of a pixel associated with a coverage value is implicit in the coverage value, so this input is not needed. Threshold generator 232 includes an input for a threshold function. However, in some embodiments, the threshold function is fixed and this input is not used.

In operation, a multi-level raster shape is input to converter 118(2) and a control signal indicating whether or not the multi-level raster shape is to be converted to a bi-level raster shape or not. If the shape is not to be converted, the multi-level raster shape is output. Otherwise, the multi-level raster shape in input to rounding module 230, which uses the variable thresholds provided by the threshold generator 232 to convert the multi-level raster shape into a bi-level raster shape.

Figure 15:
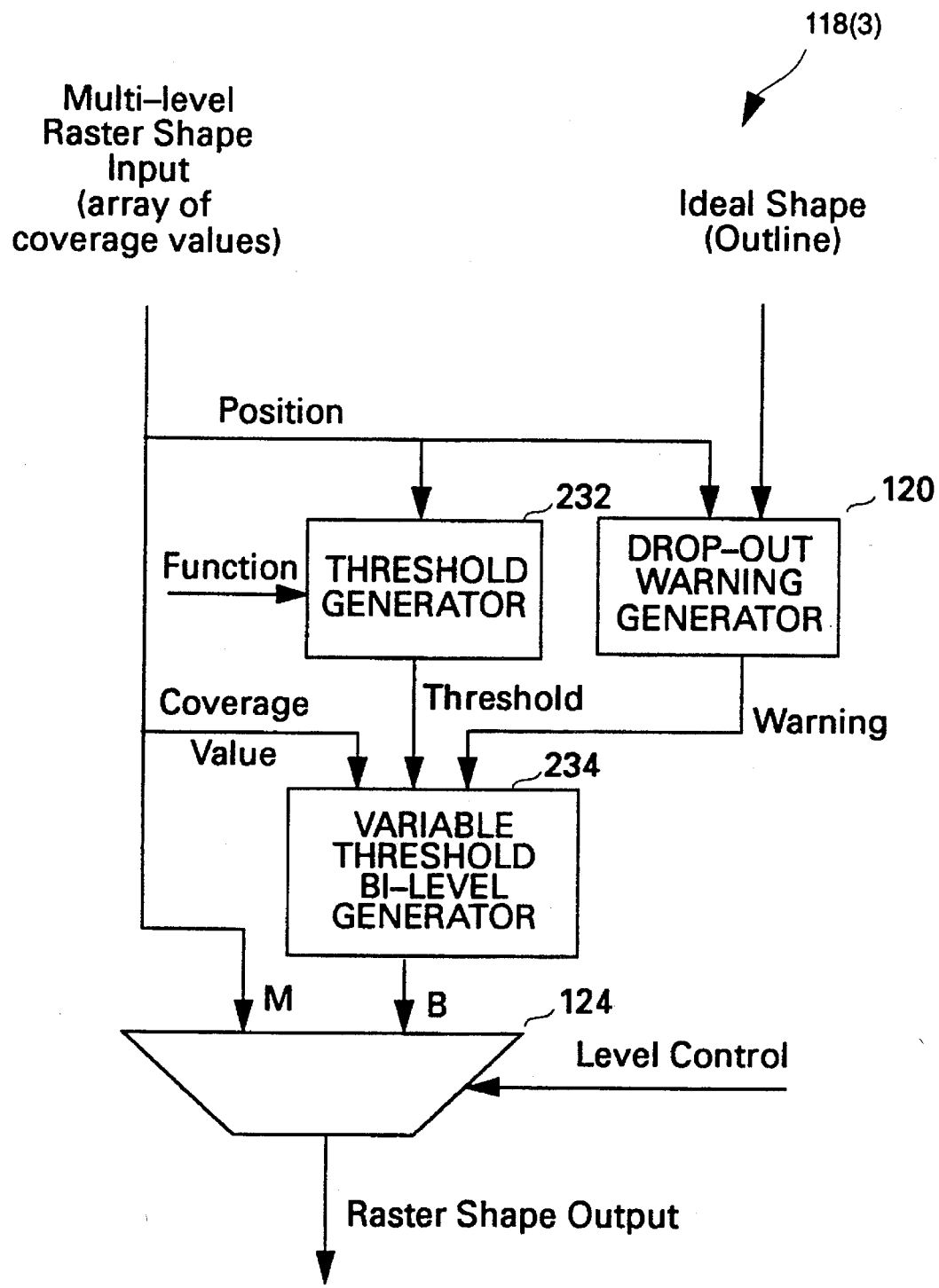
FIG. 15 is a block diagram of a multi-level raster shape to bi-level raster shape converter which corrects for drop-outs and asymmetric pixelation artifacts.

FIG. 15 is a block diagram of a multi-level raster shape to bi-level raster shape converter 118(3) which corrects for both drop-outs and asymmetric pixelation artifacts. Converter 118(3) is similar to a combination of converter 118(1) and converter 118(2). Converter 118(3) includes drop-out warning generator 120, multiplexer 124, bi-level generator 234 and threshold generator 232. In converter 118(3), the multi-level raster shape input of converter 118(3) is coupled to drop-out warning generator 120, threshold generator 232 (if position information is not implicit), bi-level generator 234 and multiplexer 124, and outputs of warning generator 120 and threshold generator 232 are coupled to inputs of bi-level generator 234. An input to converter 118(3) for the outline is also provided. This input forms an input to drop-out warning generator 120.

In operation, bi-level generator 234 rounds each coverage value in the input multi-level raster shape to either 0 or 1 based on drop-out warnings and threshold values. Warning generator 120 indicates which pixel pairs must not be both rounded to zero. If the coverage values for both pixels in a drop-out warning pair are less than their respective thresholds, bi-level generator 234 marks one of the two pixels for rounding up. Alternately, the threshold of the pixel could be changed to 0 to ensure that the coverage value is rounded up.

Using the above-described apparatus, multi-level raster shapes can be efficiently converted to bi-level raster shapes while avoiding the problems of drop-outs and asymmetric pixelation artifacts. The above description is illustrative and not restrictive. Many variations of the invention will become apparent to those of skill in the art upon review of this disclosure.

Merely by way of example, computer 102 might be a more general computing environment, with distributed computing resources. Display 104 could be replaced by other image processing devices, such as a video recorder or image storage means. Printer 106 could be a laser printer, an ink jet printer, or an impact dot matrix printer.

The scope of the invention should, therefore, be determined not with reference to the above description, but instead should be determined with reference to the appended claims along with their full scope of equivalents.

What is claimed is:

1. A method of generating a bi-level raster shape from a shape outline, the method comprising the steps of:

positioning the shape outline relative to a pixel grid;

identifying a bounding region of said pixel grid which totally encloses the positioned shape outline, said bounding region characterized by the set of pixels which are in said bounding region, wherein each pixel in the set of pixels is characterized by a pixel position relative to said bounding region;

generating a multi-level raster shape representative of the shape outline, said multi-level raster shape storable as an array of multi-level coverage values, wherein each multi-level coverage value is associated with a pixel of said set of pixels and each multi-level coverage value is selected from a plurality of more than two possible coverage values;

identifying, using results of said step of positioning, at least one pair of adjacent pixels with a drop-out warning;

flagging at least one pixel of each pair of pixels which were identified in the step of identifying;

calculating, from a variable threshold function, a threshold value for each pixel in said set of pixels, said variable threshold function being variable in that not all pixels in said set of pixels obtain the same threshold value; and rounding each multi-level coverage value in said array of multi-level coverage values to a bi-level coverage value selected from a covered value and an uncovered value, wherein said multi-level coverage value is rounded to said uncovered value when said multi-level coverage value is between said uncovered value and said threshold value, and said multi-level coverage value is rounded to said covered value when said multi-level coverage value is not between said uncovered value and said threshold value, said rounding step including the step of rounding a multi-level coverage value to said covered value regardless of its value if the pixel associated with said multi-level coverage value being rounded was flagged in the step of flagging.

2. The method of claim 1, wherein, as part of said step of rounding, said multi-level coverage value is rounded to said covered value regardless of its value when said associated pixel is flagged and said associated pixel's paired pixel's coverage value has already been rounded to said uncovered value.

3. The method of claim 1, wherein said step of identifying pixel pairs further comprises the steps of:

identifying a pixel edge nearest an edge of the shape outline; and identifying said pixel edge as a dropout warning.

4. The method of claim 3, wherein said step of identifying a pixel edge further comprises the step of identifying a plurality of pixel edges which collectively approximate the shape outline and wherein said step of identifying said pixel edge as a dropout warning further comprises the step of identifying each pixel edge in said plurality of pixel edges as a dropout warning.

5. The method of claim 3, wherein said step of identifying a pixel edge comprises a step of locating intersections of the shape outline and mid-pixel lines.

6. The method of claim 3, wherein said step of identifying a pixel edge comprises the steps of:

reducing the shape outline to a trajectory comprising a sequence of jumps, a jump being a straight line approximation to the shape outline; and identifying intersections of said trajectory and mid-pixel lines.

7. The method of claim 4, wherein said step of identifying a plurality of pixel edges comprises a step of identifying intersections of the shape outline with mid-pixel lines and adding a pixel edge nearest to each such intersection to said plurality of pixel edges being identified.

8. The method of claim 4, wherein said step of identifying a plurality of pixel edges comprises the steps of:

reducing the shape outline to one or more trajectories, each trajectory comprising a sequence of jumps, a jump being a straight line approximation to the shape outline; and identifying intersections of said one or more trajectories with mid-pixel lines and adding a pixel edge nearest to each such intersection to said plurality of pixel edges being identified.

9. A method of generating a bi-level raster shape from a shape outline, the method comprising the steps of:

positioning the shape outline relative to a pixel grid;

identifying a bounding region of said pixel grid which totally encloses the positioned shape outline, said bounding region characterized by the set of pixels which are in said bounding region, wherein each pixel in the set of pixels is characterized by a pixel position relative to said bounding region;

generating a multi-level raster shape representative of the shape outline, said multi-level raster shape storable as an array of multi-level coverage values, wherein each multi-level coverage value is associated with a pixel of said set of pixels and each multi-level coverage value is selected from a plurality of more than two possible coverage values;

calculating, from a variable threshold function, a threshold value associated with each pixel in said set of pixels, said variable threshold function being variable in that not all pixels in said set of pixels obtain the same threshold value; and rounding each multi-level coverage value in said array of multi-level coverage values to a bi-level coverage value selected from a covered value and an uncovered value, wherein a multi-level coverage value for an associated pixel is rounded to said uncovered value when said multi-level coverage value is between said uncovered value and said threshold value for said associated pixel.

10. The method of claim 9, wherein said threshold value is a value between said covered value and said uncovered value, said covered value being a value assigned to a pixel completely covered by the shape outline and said uncovered value being a value assigned to a pixel completely uncovered by the shape outline.

11. The method of claim 9, wherein said threshold value associated with a pixel alternates from pixel to adjacent pixel between a first threshold and a second threshold, said first threshold being a value closer to said uncovered value than an average of said uncovered value and said covered value, and said second threshold being a value closer to said covered value than said average.

12. A workstation comprising:

a raster display, which displays an image using a grid of pixels each colorable with one of two colors to suggest said image;

storage means for storing ideal shapes which are each described by an outline comprising at least one closed contour not limited by a resolution of said raster display;

relation means, coupled to a device parameter input and said storage means, for receiving device resolution parameters and for relating ideal shapes received from said storage means to a pixel grid of said raster display;

multi-level filling means, coupled to said relation means and said storage means, for generating a multi-level raster shape based on said outline and said pixel grid;

raster shape storage means, coupled to receive multi-level coverage values for pixels of said pixel grid, said multi-level raster shape storable as an array of multi-level coverage values, wherein each multi-level coverage value is associated with a pixel in said set of pixels and each multi-level coverage value is selected from a plurality of more than two possible coverage values;

rounding means for generating a bi-level raster shape from said multi-level raster shape, wherein multi-level coverage values of said multi-level raster shape are rounded to one of a covered value and an uncovered value, said rounding means configured to round a multi-level coverage value to said covered value when said multi-level coverage value is between said covered value and a threshold value associated with the pixel being rounded and to otherwise round said multi-level coverage value to said uncovered value, wherein threshold values associated with pixel are variable in that not all pixels have the same threshold value associated with them; and means, coupled to said rounding means and said raster display, for causing said raster display to display a pixel of a first of said two colors when a coverage value associated with said pixel is said uncovered value and to display a pixel of a second of said two colors when said coverage value associated with said pixel is said covered value.

13. The apparatus of claim 12, wherein said raster display is capable of displaying more than one raster shape simultaneously and said two colors used for one raster shape are not necessarily the same two colors used for another raster shape simultaneously displayed on said raster display.

14. The workstation of claim 12, wherein said threshold value associated with a pixel alternates from pixel to adjacent pixel between a first threshold and a second threshold, said first threshold being a value closer to said uncovered value than an average of said uncovered value and said covered value, and said second threshold being a value closer to said covered value than said average.

* * * * *